United States Patent Office 3,455,363
Patented July 15, 1969

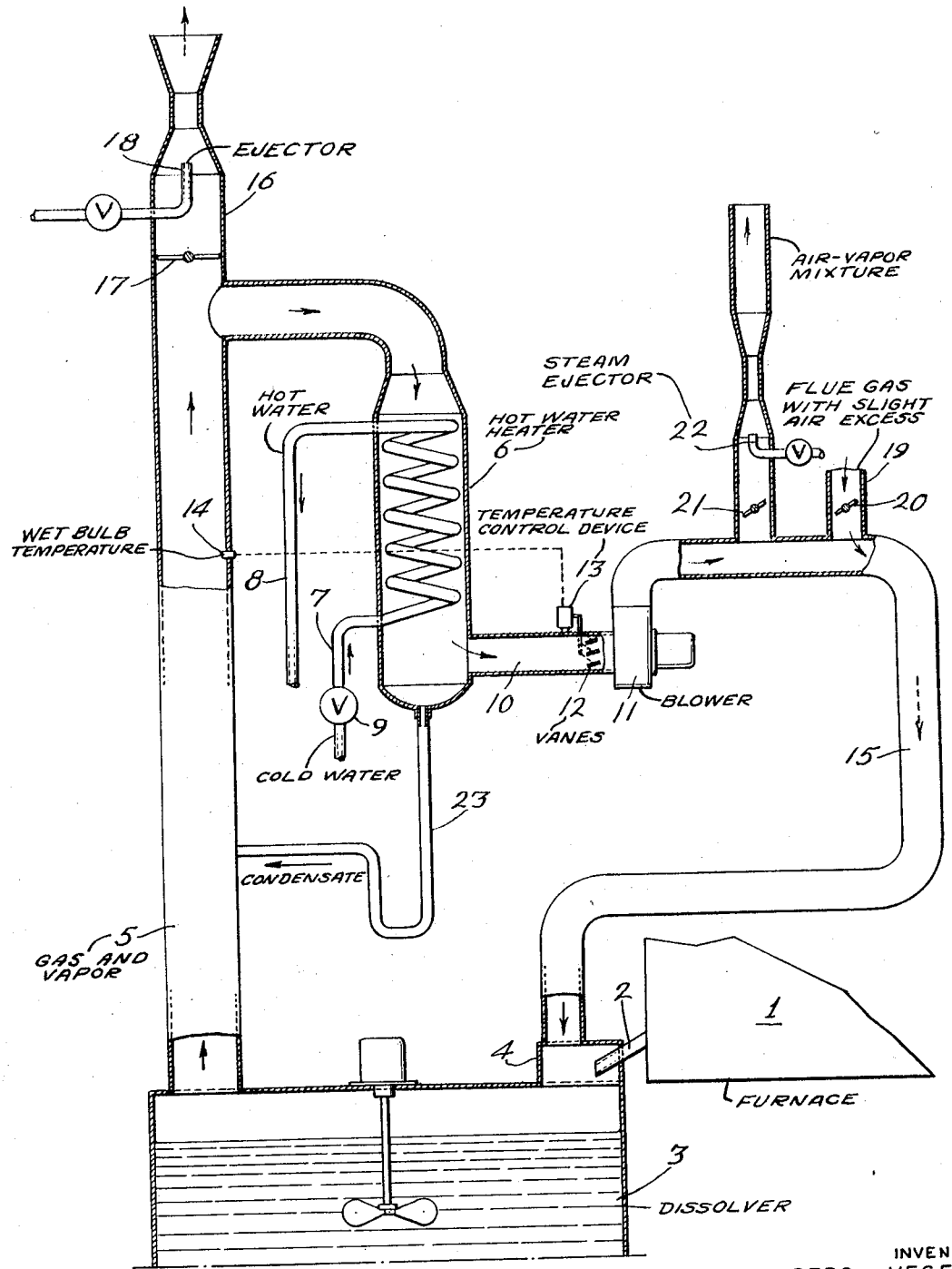

3,455,363
METHOD FOR RECOVERING HEAT OUT OF AN AIR-WATER VAPOUR MIXTURE FROM A DISSOLVER AT A SODA HOUSE UNIT
Anders Vegeby, Bandhagen, Sweden, assignor to Aktiebolaget Svenska Flaktfabriken, Stockholm, Sweden
Filed July 25, 1967, Ser. No. 655,845
Claims priority, application Sweden, July 29, 1966, 10,314/66
Int. Cl. B01d 1/14
U.S. Cl. 159—47                                      4 Claims

ABSTRACT OF THE DISCLOSURE

Maximum heat recovery from the waste liquors in chemical pulp production and minimum oxidation of the melt in the waste liquors is obtained by recycling the air-steam mixture generated in the dissolver and limiting the inflow of fresh air. This is accomplished by directing the generated air-steam mixture through a water-cooled condenser to heat the cooling water for recovery as a hot water product, the uncondensed portion of the mixture being returned to the dissolver. To compensate for variations in the amount of steam generated in the dissolver by the melt, a portion of the air-steam mixture may be discharged, and flue gas low in oxidizing medium from the furnace may be added to maintain the desired flow of the air-steam mixture without inducing an inflow of fresh air.

---

For the recovery of chemicals and heat from the waste liquors in chemical pulp production injection units are mostly used, which comprise a smelting furnace combined with a boiler. Subsequent to the evaporation to an appropriate concentration, the liquor is injected into the smelting furnace, whereby it is finally evaporated to full content upon the contact with the hot flue gases, ignited and combusted. The chemicals are recovered usually as a melt, which is drawn off in the bottom of the unit, and the heat from the flue gases is taken up by the water-cooled walls of the furnace and by the tube set and superheater of the boiler.

At the recovery unit the hot melt from the boiler is taken out to a dissolver, where an aqueous solution, weak liquor, is supplied for the preparation of so-called green liquor. The weak liquor usually is supplied to the dissolver at a temperature of about 65° C., and while the melt dissolves in water a steam amount evaporates, which corresponds to the difference between the solution heat of the melt and its sensible heat above the temperature of the solution, on one hand, and the heat amount required for heating the weak liquor to the temperature in the dissolver, on the other hand. Apparatus already have been constructed for recovering part of the heat in the air-water vapour mixture escaping from the dissolver, in which apparatus the air-steam mixture is caused to pass through a condenser or a scrubber for the preparation of hot water, whereafter the uncondensed part escapes into the atmosphere.

The present invention has as its object to render possible the utilization of all heat, in that the air-steam mixture, which leaves the condenser or scrubber for the preparation of hot water, is returned to the dissolver instead of as heretofore being discharged into the atmosphere. In the method according to the invention the air-steam mixture, which is poor of water vapour, is returned after having passed through the water heater to the dissolver, in which it again is concentrated with evaporated water vapour, which condenses during the subsequent passage through the hot water heating part. In this way practically 100% of the heat released in the dissolver can be utilized for the preparation of hot water. This is of considerable economic importance, because the wet temperature of the air-steam mixture from the dissolver can be maintained as high at 85° C. without giving rise to difficulties due to steam leakage. Owing to the high wet temperature it is possible to produce hot water with a temperature of 75° C. Hereby it is possible to utilize this heat not only in factories for the production of bleached pulp, where hot water of this temperature is required in the bleaching department, but also in factories for the production of unbleached pulp, because the heat from the melt can be used in this case for heating the make-up water for the hot water production in the boiler plant of the factory.

The method according to the invention involves also other advantages. In arrangements of conventional design relatively large air amounts leak into the system, usually in the openings at the melt chutes. This air causes to some extent oxidation of the melt, whereby part of the sodium sulphide transforms into sodium thiosulphate, and the oxidation even can continue to sodium sulphate. Sodium thiosulphate constitutes an undesirable compound in the melt, because its presence in the white liquor, which is prepared from the melt solution, increases the corrosion in the digester house and washing plant. The sodium sulphate is not desirable, because it constitutes a useless ballast, which increases the chemical losses at its passage through the soda house, the causticizing, digester, washing and evaporation plants of the chemical pulp factory. According to the invention the air-steam mixture is returned from the hot water heater to the dissolver, whereby the oxygen of the air in the gas mixture gradually is consumed and in principle a circulating inert gas is obtained, so that no oxidation of sulphide can take place. With the new system it also is possible to let a small part of the air-steam mixture after the hot water preparation part be removed from the system and be replaced at the blowing-in into the dissolver by flue gas, which already has a very low oxygen pressure so that the oxidation conditions are improved, especially at the start. The gas supplied in this way is preferably taken out after the precipitator or other gas cleaning means so that the gas for avoiding clogging difficulties is as free from dust as possible.

An arrangement for carrying out the method according to the invention is described more in detail in the following with reference to the accompanying drawing figure, which shows an installation for the recovery of heat out of an air-water vapour mixture from a dissolver. From a recovery unit 1 an outflow or a chute 2 extends, through which the melt from the combustion of the black liquor is fed to a dissolver 3 through special hoods 4. If required, several outflows 2 may be provided. The hoods are intended to reduce the air inflow to the dissolver 3 to the greatest possible extent. The air-steam mixture from the dissolver is discharged through a duct 5 to a hot water heater 6, which in this case is constructed as a surface condenser. Cold water is introduced through the pipe 7, and subsequent to its heating the water is discharged through the pipe 8. The water amount is controlled according to the desired temperature by a valve 9. The uncondensed part of the air-steam mixture is removed from the hot water heater 6 through a duct 10 to a fan 11. The capacity of the fan is most suitably adjusted by a guiding vanes means 12 with a temperature control device 13, which receives its impulse from the wet temperature in the duct 5 in which an impulse means 14 is built. From the fan 11 the air-steam mixture is directed back through the duct 15, which opens into the hoods 4 on the dissolver.

In case of exceptionally increased melt loads the steam discharge from the dissolver may be greater than the amount adapted to condense in the hot water heater 6, which has optimum dimensions from an economic point of view. For this purpose, a connecting duct 16 with a shut-off valve 17 is attached to the duct 5, by which valve part of the air-steam mixture can be discharged into the atmosphere. For reducing the space requirement in the recovery plant an ejector 18 is utilized so as to impart to said amount of air-steam mixture such a pressure increase that the dimensions of the duct can be reduced considerably.

If it is deemed particularly important to prevent oxidation of the melt, flue gas from the soda house unit with a low air excess can be supplied to the system through the duct 19 with the control valve 20, whereby a corresponding amount of air-steam mixture is discharged from the system through the duct 21, which may be provided with a steam ejector 22. The outlet from the ejector 18 and the ejector 22 can be combined to a common outlet duct extending upwards to the roof of the plant. Condensate formed in the hot water heater is separated in known manner and returned through a drain pipe 23 to the dissolver 3 either directly or via the duct 5 for the air-steam mixture.

I claim:

1. A method for recovering heat from an air-steam mixture generated in a dissolver receiving melt from a waste-liquor boiler-furnace, comprising the steps of passing said melt from the furnace into the dissolver, thus generating steam; entraining the steam in a recycling gas stream consisting of an air-steam mixture low in oxidizing medium; passing the air-steam mixture to a water-cooled condenser wherein a portion of the steam is condensed and the cooling water is heated and recovered as a hot water product; and directing the uncondensed part of the air-steam mixture from the condenser to the dissolver to comprise the recycling gas stream low in oxidizing medium.

2. A method according to claim 1 including the step of replenishing the recycling gas stream by adding flue gas low in oxidizing medium from said boiler-furnace.

3. A method according to claim 1 including the step of discharging a part of the air-steam mixture to the atmosphere and recycling the remaining part of said mixture.

4. A method according to claim 3 wherein said discharging step removes the first part by ejection in at least one of the two parts of the cycle respectively upstream and downstream of said water-cooled condenser.

References Cited

UNITED STATES PATENTS

| | | | |
|---|---|---|---|
| 1,264,229 | 4/1918 | Vautin | 122—28 |
| 1,546,345 | 7/1925 | Laird | 203—22 |
| 1,597,718 | 8/1926 | Bringhenti | 122—28 |
| 2,007,799 | 7/1935 | Gloersen | 23—285 |
| 2,638,444 | 5/1953 | Kappe | 210—2 |
| 3,183,145 | 5/1965 | Collins | 162—47 |
| 3,376,204 | 4/1968 | Tidball | 203—7 |

FOREIGN PATENTS 61,415    5/1912    Switzerland.

NORMAN YUDKOFF, Primary Examiner

J. SOFTER, Assistant Examiner

U.S. Cl. X.R.

158—16; 162—47